United States Patent
Büehler

(10) Patent No.: US 10,591,980 B2
(45) Date of Patent: Mar. 17, 2020

(54) POWER MANAGEMENT WITH HARDWARE VIRTUALIZATION

(71) Applicant: Mentor Graphics Corporation, Wilsonville, OR (US)

(72) Inventor: Karl Büehler, Bad Duerrheim (DE)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/986,891

(22) Filed: Jan. 4, 2016

(65) Prior Publication Data

US 2016/0195919 A1    Jul. 7, 2016

Related U.S. Application Data

(60) Provisional application No. 62/099,368, filed on Jan. 2, 2015.

(51) Int. Cl.
*G06F 1/32*    (2019.01)
*G06F 1/3287*    (2019.01)

(52) U.S. Cl.
CPC .............. *G06F 1/3287* (2013.01); *G06F 1/32* (2013.01); *Y02D 10/171* (2018.01); *Y02D 50/20* (2018.01)

(58) Field of Classification Search
CPC ..... G06F 1/32; G06F 1/28; G06F 9/44; G06F 1/00
USPC ....... 713/300, 310, 320, 321, 322, 323, 324, 713/340, 375
See application file for complete search history.

(56) References Cited

U.S. PATENT DOCUMENTS

| 4,912,628 | A | 3/1990 | Briggs | |
|---|---|---|---|---|
| 4,970,639 | A | 11/1990 | Diefendorf et al. | |
| 6,449,683 | B1 * | 9/2002 | Silvester | G06F 1/3203 711/103 |
| 8,250,331 | B2 | 8/2012 | Yamada et al. | |
| 9,829,950 | B2 * | 11/2017 | Bozek | G06F 1/3203 |
| 2002/0010844 | A1 * | 1/2002 | Noel | G06F 9/5077 711/153 |
| 2004/0181657 | A1 * | 9/2004 | Armstrong | G06F 9/5077 713/1 |

(Continued)

FOREIGN PATENT DOCUMENTS

JP    2005157748    6/2005

*Primary Examiner* — Jaweed A Abbaszadeh
*Assistant Examiner* — Keshab R Pandey
(74) *Attorney, Agent, or Firm* — Mentor Graphics Corporation

(57) ABSTRACT

This application discloses a computing system that can enter into a low power mode, shut down all components except for memory, and exit from the low power mode and restore running programs where they left off before entering the low power mode. To enter the low power mode, a processing device, in a user mode, can store program information to a memory. The processing device can switch to a hypervisor mode and store processor state information to a reserved portion of the main memory. The computing system can then disable hardware components of the computing system. To exit the low power mode, the computing system can enable the hardware components of the computing system, and activate the hypervisor mode of the processing device, allowing retrieval of the processor state information. The processing device can switch to the user mode and load stored program information from the main memory.

18 Claims, 5 Drawing Sheets

(56) References Cited

U.S. PATENT DOCUMENTS

| | | | |
|---|---|---|---|
| 2004/0194086 A1 | 9/2004 | Suzaki | |
| 2007/0157045 A1* | 7/2007 | Gu | G06F 9/4418 |
| | | | 713/323 |
| 2009/0150463 A1 | 6/2009 | Sekiguchi et al. | |
| 2009/0292934 A1* | 11/2009 | Esliger | G06F 1/3203 |
| | | | 713/323 |
| 2010/0023942 A1 | 1/2010 | Sheu et al. | |
| 2011/0004745 A1* | 1/2011 | Kubota | G06F 9/4418 |
| | | | 713/1 |
| 2013/0326102 A1 | 12/2013 | Marietta et al. | |
| 2014/0196034 A1* | 7/2014 | Amano | G06F 9/45533 |
| | | | 718/1 |
| 2015/0227192 A1* | 8/2015 | Kruglick | G06F 1/3243 |
| | | | 713/323 |

\* cited by examiner

POWER MANAGEMENT WITH HARDWARE VIRTUALIZATION

RELATED APPLICATION

This patent application claims priority to U.S. Provisional Patent Application No. 62/083,800, filed Nov. 24, 2014, which is incorporated by reference herein.

TECHNICAL FIELD

This application is generally related to electronic devices and, more specifically, to power management in electronic devices with hardware virtualization.

BACKGROUND

Many computing systems include one or more low power saving modes. These computing systems can enter a low power mode, such as a Suspend-to-RAM (STR) mode for Linux-based computing systems or a Suspend-to-Disk (STD) mode, by storing program data and a processor state before allowing most of components in the computing system to be turned off. The program data can include a system configuration, any open applications, any active files, or the like, which can be stored to a main memory, for example, a random-access memory (RAM). The processor state can include values of registers and internal states of a processor in the computing system, which can be stored to a non-volatile memory. In the low power mode, the computing system provides enough power to the RAM to retain stored data and provides power to those components in the computing system capable of responding to an event prompting the computing system to wake-up from the low power mode.

For the computing system to wake-up from the low power mode, the processor typically executes BIOS (Basic Input/Output System) firmware, for example, implementing a System Management Mode (SMM), and then implements a boot loader and possibly associated following software to load an operating system. The processor can utilize the operating system and a configurable memory mapping retained in a memory management unit (MMU) to retrieve the values of registers and internal states of the processor and wake-up from the low power mode. Since the operating system understands the virtual addresses for the program data, the computing system, after the restart, can continue any programs where they were interrupted when entering into the low power mode.

There have been prior attempts to fully shutdown all components in the computing system except for the RAM during a Suspend-to-RAM operation and still be able to restart with programs leaving off where they were prior to entering the low power mode. Unfortunately, when a low power mode shuts down the memory management unit, the particular configuration of the memory mapping utilized to store both the program data and the processor state also has to be stored. During wake-up from the low power mode, a the boot loader utilizes new memory mapping from the memory management unit to perform its start-up operations, but when the prior configuration of the memory mapping in the memory management unit gets restored it overwrites the memory mapping utilized by the boot loader, which scrambles the memory mapping for the computing system.

SUMMARY

This application discloses a computing system that can enter into a low power mode, shut down all components except for memory, and exit from the low power mode and restore running programs where they left off before entering the low power mode. To enter the low power mode, a processing device, in a user mode or an operating system mode, can store program information to a memory. The processing device can switch to a hypervisor mode and store processor state information to a portion of the main memory reserved for the hypervisor mode. The computing system can then disable hardware components of the computing system. To exit the low power mode, the computing system can enable the hardware components of the computing system, and activate the hypervisor mode of the processing device, allowing retrieval of the processor state information. The processing device can switch to the user mode or the operating system mode and load stored the program information from the main memory. Embodiments are described in greater detail below.

DETAILED DESCRIPTION

Illustrative Operating Environment

Figure 1:
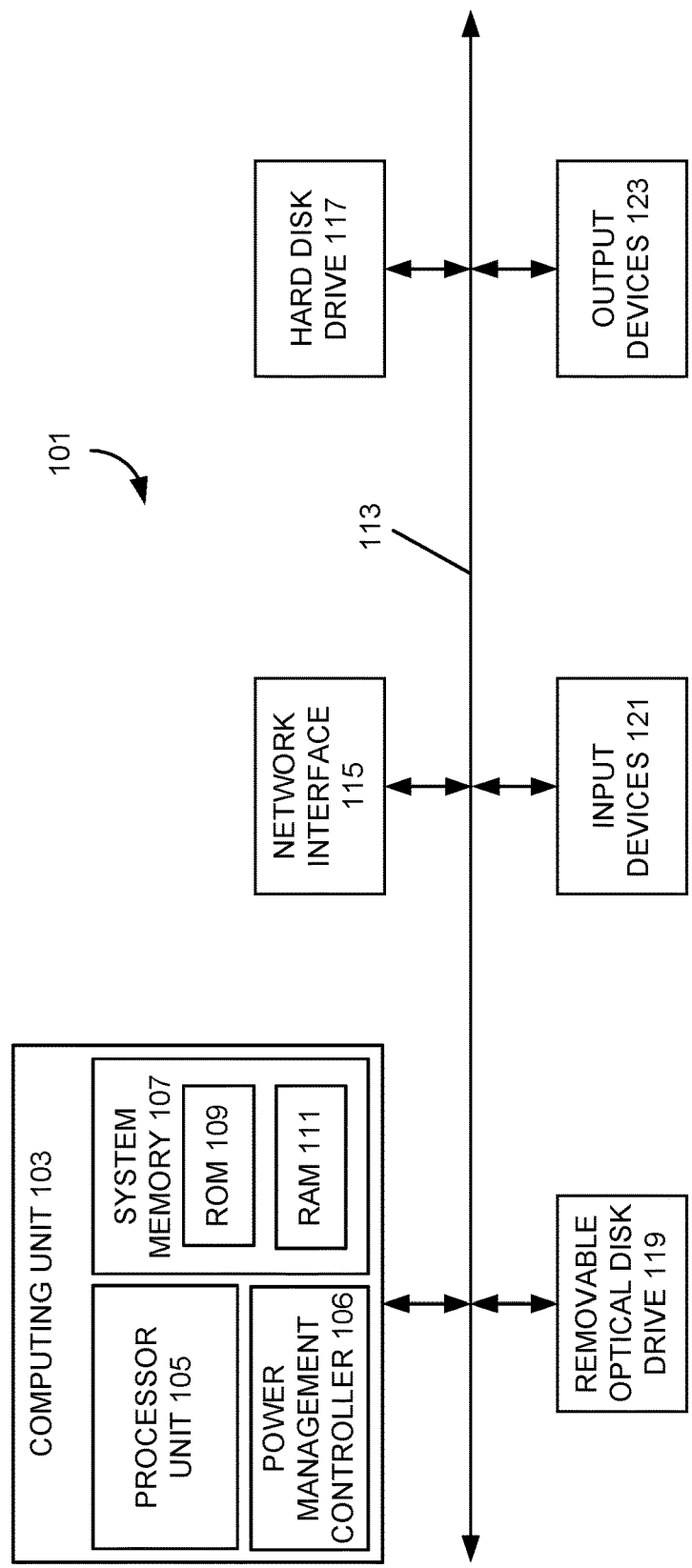
FIGS. 1 and 2 illustrate an example of a computer system of the type that may be used to implement various embodiments of the invention.
Figure 2:
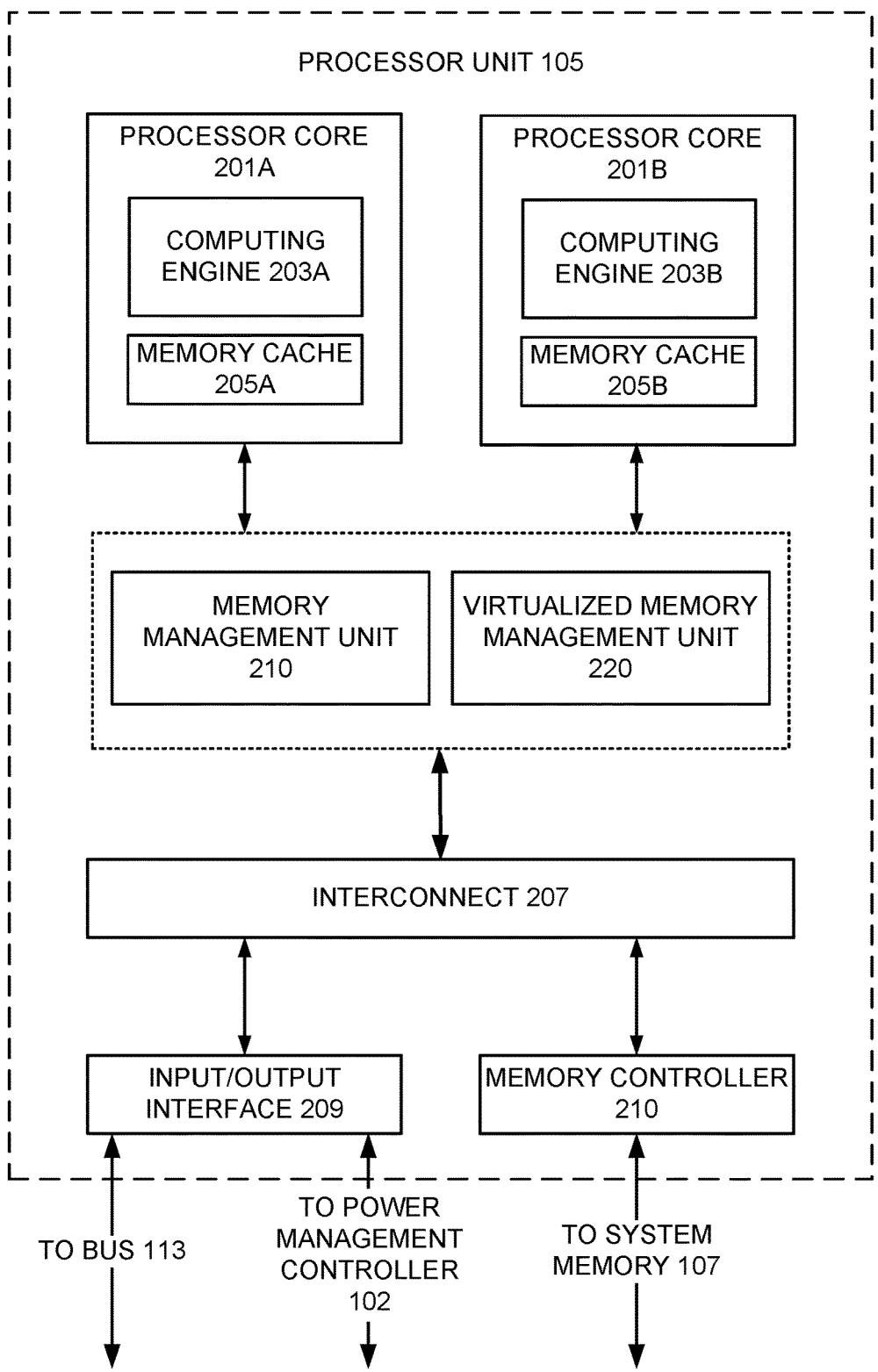

FIGS. 1 and 2 illustrate an example of a computer system of the type that may be used to implement various embodiments of the invention. Referring to FIG. 1, various examples of the invention may be implemented through the execution of software instructions by a computing device 101, such as a programmable computer. The computing device 101 can includes a computing unit 103 connected, either directly or indirectly, through a bus 113 or alternate communication structure, to one or more peripheral devices 117-123.

The computing unit 103 can include a processing unit 105, which can be any type of programmable electronic device capable of executing software instructions. In some embodiments, the processing unit 105 be based on an x86 architecture and allow for hardware virtualization depending on a mode of operation.

The computing unit 103 can include a power management controller 106 to determine a power mode for the computing unit 103 and/or the computing device 101. In some embodiments, the power management controller 106 can set the computing unit 103 in one or more of a variety of power modes, such as a normal operating mode, a sleep mode, a hibernate mode, or the like. When the computing unit 103 includes multiple power domains, the power management controller 106 can selectively prompt shutdown or sleeping of a portion of the computing unit 103, while other portions of the computing unit 103 remain in a normal operating mode. Embodiments of the power management controller 106 will be described below in greater detail.

The computing unit 103 can include a system memory 107 to store software instructions for execution by the processing unit 105. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The peripheral devices 117-123 can include one or more additional memory storage devices, such as a hard disk drive 117, which can be magnetic and/or removable, a removable optical disk drive 119, and/or a flash memory card, each capable of being coupled to the computing unit 103. The computing unit 103 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

With some implementations of the invention, the processor unit 105 can have more than one processor core. Accordingly, FIG. 2 illustrates an example of a multi-core processor unit 105 that may be employed with various embodiments of the invention. The processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to store and retrieve data and/or instructions for execution.

Each processor core 201A and 201B can be connected to an interconnect 207 via at least one of a memory management unit 210 or a virtualized memory management unit 220. The processor cores 201A and 201B can communicate through the interconnect 207 with an input/output interface 209 and a memory controller 210. The input/output interface 209 can provide a communication interface to the bus 113 or to the power management controller 102. In some embodiments, the processor unit 105 can communicate with the power management controller 102 directly via the interconnect 207. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Each processor core 201A and 201B can operate in various operating modes, such as a user mode, an operating system mode, or a hypervisor mode. When in the user mode, the processor cores 201A and 201B can have limited access to the interconnect 207 and/or bus 113. When in the operating system mode, the processor cores 201A and 201B can have full access to the interconnect 207 and/or bus 113. The hypervisor mode can allow the processor cores 201A and 201B to control actions the processor cores 201A and 201B perform while in either of the user mode or the operating system mode.

The processor cores 201A and 201B, in the user mode or operating system mode, can access memory, for example, system memory 107, hard disk drive 117, removable optical disk drive 119, or other memory devices, via the memory management unit 210. The memory management unit 210 can abstract the physical memory addresses of the memory into virtual addresses usable by the processor cores 201A and 201B. The memory management unit 210 can define a memory mapping, which describes the assignment of physical memory addresses to virtual memory addresses. Since the memory management unit 210 has configurable memory mapping ability, in some embodiments, the memory management unit 210 can include at least one register, the value of which can determine the memory mapping.

The processor cores 201A and 201B, in the hypervisor mode, can access memory, for example, system memory 107, hard disk drive 117, removable optical disk drive 119, or other memory devices, via the virtual memory management unit 220. The virtual memory management unit 220, similar to the memory management unit 210, can abstract the physical memory addresses of the memory into virtual addresses usable by the processor cores 201A and 201B. The virtual memory management unit 220, however, includes a predefined memory mapping, describing a set assignment of physical memory addresses to virtual memory addresses.

Power Management with Hardware Virtualization

Figure 3:
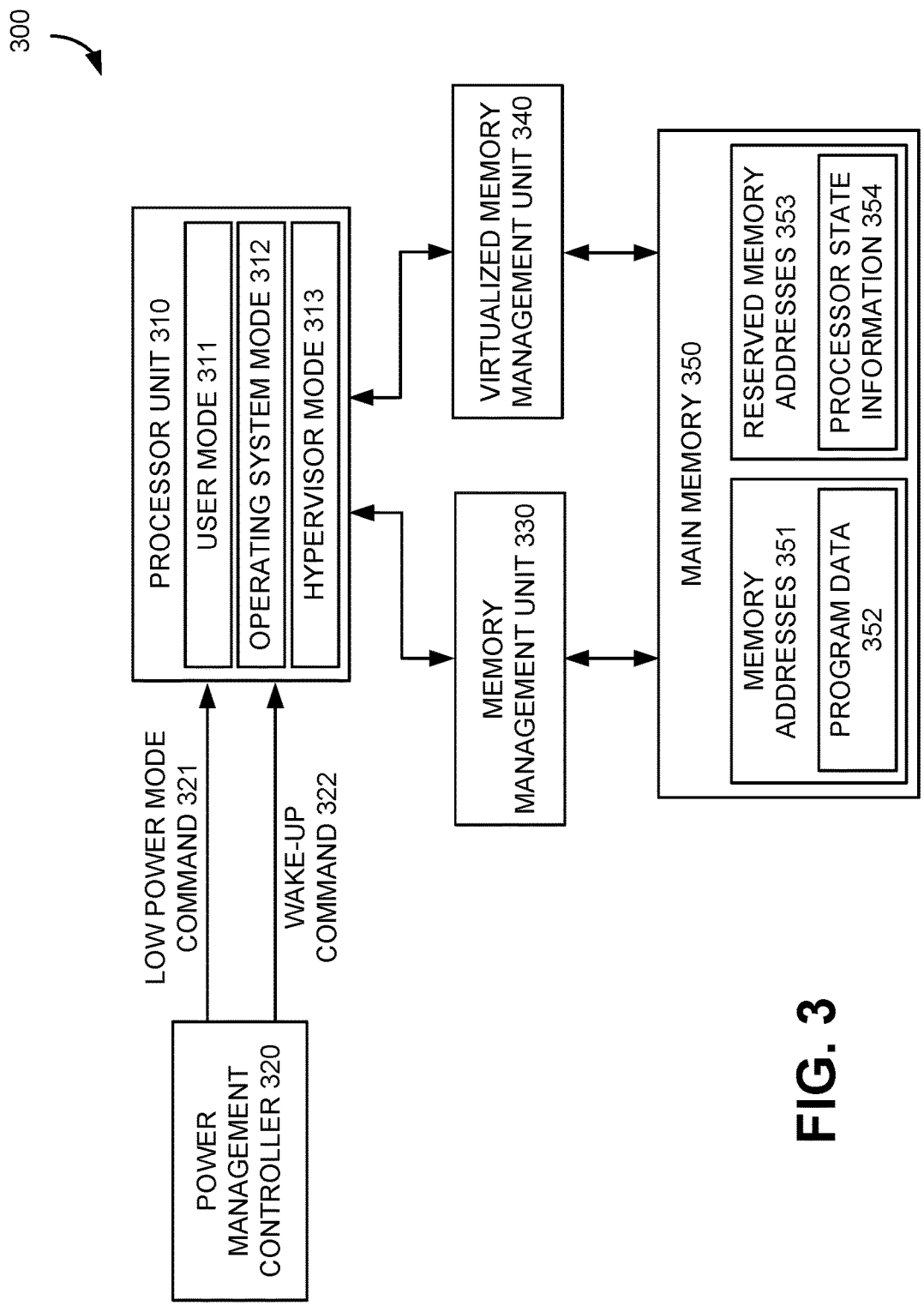
FIG. 3 illustrates an example operations block diagram for a computing device implementing a low power mode with hardware virtualization according to various embodiments of the invention.

FIG. 3 illustrates an example operations block diagram for a computing device 300 implementing a low power mode with hardware virtualization according to various embodiments of the invention. Referring to FIG. 3, the computing system 300 can include a processor unit 310 having various operational modes, such as a user mode 311, an operating system mode 312, and a hypervisor mode 313. In the user mode 311 or the operating system mode 312, the processor unit 310 can execute one or more programs. The programs can be stored in a main memory 350, for example, as program data 352 stored in memory addresses 351.

The processor unit 310 can access the main memory 350 in the user mode 311 or the operating system mode 312 via a memory management unit 330. The memory management unit 330 can abstract the memory addresses 351 of the main memory 350 into virtual addresses usable by the processor unit 310. The memory management unit 330 can define a memory mapping, which describes the assignment of the memory addresses 351 to the virtual memory addresses. Since the memory management unit 330 has configurable memory mapping ability, in some embodiments, the memory management unit 330 can include at least one register, the value of which can determine a configuration of the memory mapping.

In the hypervisor mode 313, the processor unit 310 can utilize virtualization instructions to implement a hypervisor or a virtual machine monitor capable of allowing a guest or virtual operating system to run on the processor 310 without affecting a host operating system or other guest or virtual operating systems running on the processor unit 310. The processor unit 310 implementing the guest or virtual operating system can allow for native kernel operations and provide kernel-level hardware access, such as accesses to the main memory 350 via a virtual memory management unit 340. The virtual memory management unit 340 can abstract reserved memory addresses 353 of the main memory 350 into virtual memory addresses usable by the processor unit 310. A memory mapping between the virtual memory addresses and the reserved memory addresses 353 can be predefined or set in the virtual memory management unit 340.

The computing device 300 can include a power management controller 320 to direct the rest of the computing system 300 to enter and exit from various power modes. For example, the power management controller 320 can detect when the computing device 300 should enter a low power mode, such as a sleep mode or a hibernate mode. In some embodiments, the low power mode can be a suspend-to-RAM (STR) or a suspend-to-disk (STD) mode. The power management controller 320 can send commands to the processor unit 310, such as a low power mode command 321 and a wake-up command 322, which can prompt the processor unit 310 to enter a low power mode or wake-up from the lower power mode. The processor unit 310 can implement a process to enter and exit the low power mode that allows any programs running on the computing device 300 to be restarted where they left off upon entering the low power mode, while also allowing all hardware components in the computing device 300 to be powered off except volatile portions of the main memory 350.

The processor unit 310 can enter the low power mode in response to receiving the low power mode command 321 from the power management controller 320. For example, the processor unit 310, in the user or operating system mode, can store the program data 352 to memory addresses 351 in the main memory 350 via the memory management unit 330. The processor unit 310, in the hypervisor mode, can store processor state information 354 to the reserved memory addresses in the main memory via the virtual memory management unit 340. Embodiments of entering the low power mode will be described below with reference to FIG. 4.

The processor unit 310 can exit or wake-up from the low power mode in response to receiving the wake-up command 322 from the power management controller 320. For example, the processor unit 310, in the hypervisor mode, can retrieve processor state information 354 to the reserved memory addresses in the main memory via the virtual memory management unit 340. The processor unit 310, in the user or operating system mode, can store the program data 352 to memory addresses 351 in the main memory 350 via the memory management unit 330. Embodiments of exiting the low power mode will be described below with reference to FIG. 5.

Figure 4:
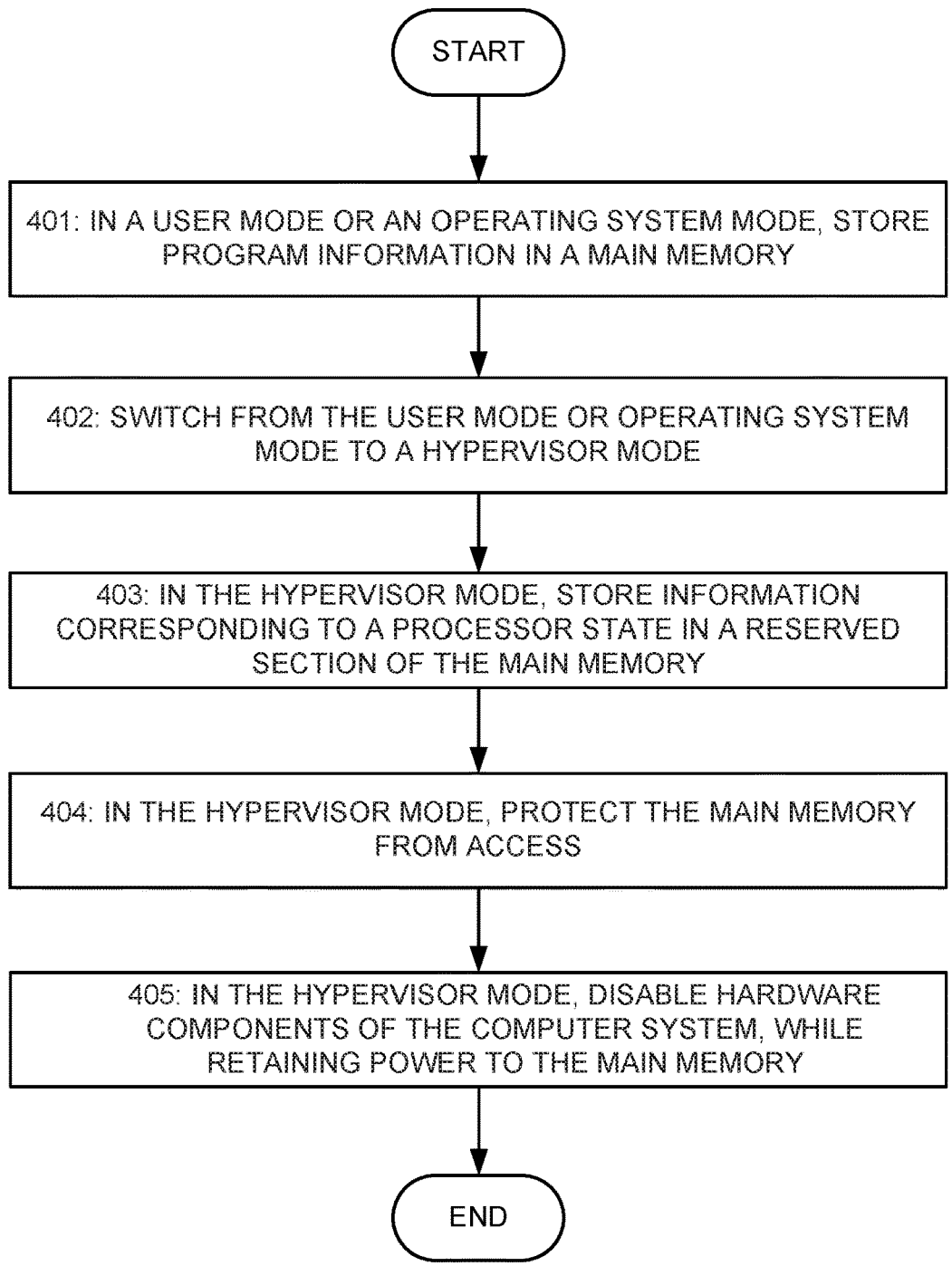
FIG. 4 illustrates a flowchart showing an example process for entering a low power mode with hardware virtualization according to various examples of the invention.

FIG. 4 illustrates a flowchart showing an example process for entering a low power mode with hardware virtualization according to various examples of the invention. Referring to FIG. 4, in a block 401, a processing device, operating in a user mode or an operating system mode, can store program information in a main memory. The processing device can store the program information in the main memory with its operating system in response to a command from a power management controller. The processing device can store the program data with a memory mapping defined by a memory management unit, for example, a value stored in one or more registers in the memory management unit.

In a block 402, the processing device can switch from the user mode or the operating system mode to a hypervisor mode. In some embodiments, the processing device can perform the mode-switching in response to a "hypervisor call," which can prompt the processing device to change to a hypervisor mode. In some embodiments, when entering the hypervisor mode, the processing device can pass control from the operating system in the user mode or the operating system mode to a program running in the hypervisor mode. The program can be stored in a read-only memory or in a reserved portion of the main memory corresponding to the hypervisor mode. In other embodiments, the processing device can switch to the hypervisor mode in other ways, such as an intentional access to certain hardware resources, or the like.

In a block 403, the processing device, operating in the hypervisor mode, can store information corresponding to a processor state in the reserved section of the main memory. In some embodiments, the program running in the hypervisor mode can prompt the processing device to store the processor state information. The processor state information can include various register values and states of the processing device, including the value of the register in the memory management unit that controls the configurable memory mapping between physical memory addresses in the main memory and virtual memory addresses utilized by the processing device while in the user mode or the operating system mode.

In a block 404, the processing device, operating in the hypervisor mode, can protect the main memory from access. In some embodiments, the processing device can set bits in the virtual memory management unit and/or the memory management unit, which can prohibit access to the main memory.

In a block 405, the processing device, operating in the hypervisor mode, can disable hardware components of the computer system, while retaining power to the main memory. In some embodiments, the processing device can shut down all of the hardware components of the computer system except for the main memory when the main memory is volatile.

Figure 5:
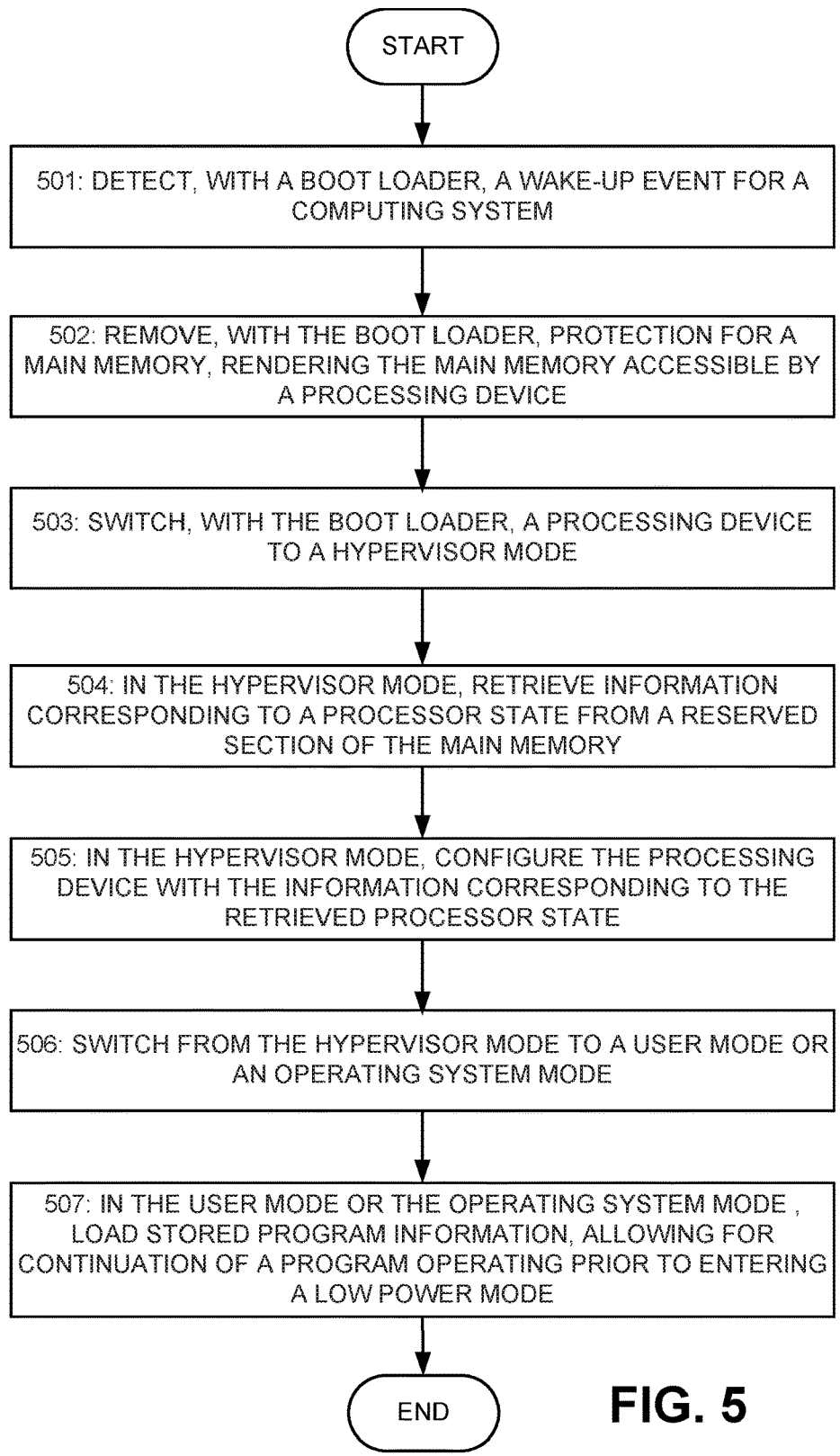
FIG. 5 illustrates a flowchart showing an example process for waking-up from a low power mode with hardware virtualization according to various examples of the invention.

FIG. 5 illustrates a flowchart showing an example process for waking-up from a low power mode with hardware virtualization according to various examples of the invention. Referring to FIG. 5, in a block 501, a processing device can detect a wake-up event for a computing system. In some embodiments, during start-up of the computing system, the processing device can execute a boot loader, which, for example, can load the operating system for the processing device into memory. The processing device executing the boot loader also can detect that the computing system is to be restored following a low power mode to run programs where they left off prior to entering the low power mode. In some embodiments, the processing device executing the boot loader can detect the restoration from a signature stored in a non-volatile memory, through signaling from a power supply, or the like.

In a block 502, the processing device, implementing the boot loader, can remove protection for a main memory, rendering the main memory accessible by the processing device. In some embodiments, the processing device can unset bits in the virtual memory management unit and/or the memory management unit, which can allow access to the main memory.

In a block 503, the processing device, implementing the boot loader, can switch to a hypervisor mode, for example, based on the detection that the computing system is to be restored following a low power mode to run programs where they left off prior to entering the low power mode. In some embodiments, the boot loader can switch the processing device to the hypervisor mode by activating a program running in the hypervisor mode.

In a block 504, the processing device, operating in the hypervisor mode, can retrieve information corresponding to a processor state from a reserved section of the main memory. Since, in the hypervisor mode, the processing device has access to a reserved section of the main memory as defined by a virtual memory management unit, the processing device knows where to retrieve the processor state information from the main memory.

In a block 505, the processing device, operating in the hypervisor mode, can configure the processing device with the information corresponding to the retrieved processor state. The processing device, when configured with the processor state information, can have a same configuration as the processing device had prior to entering the low power mode. The processor state information can include various values of registers, including a value corresponding to a register that configures a memory mapping in a memory management unit for the processing device. Since the boot loader had previously passed control to the program in the hypervisor mode, writing the value to the register that configures the memory mapping in the memory management unit does not scramble processing device's view of the main memory.

In a block 506, the processing device can switch from the hypervisor mode to a user mode or an operating system mode. In some embodiments, the processing device can pass control from the program in the hypervisor mode to an operating system running in the user mode or the operating system mode. The operating system can resume execution by the processing device at the point it was executing prior to entering the low power mode.

In a block 507, the processing device, operating in the user mode or the operating system mode, can load stored program information for continuation of a program operating prior to entering a low power mode. In some embodiments, since the operating system understands the virtual addresses of the stored program information, the processing device implementing the operating system can retrieve the stored program information utilizing the memory mapping in the memory management unit.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    entering, by a computing system, a low power mode by utilizing a configurable memory mapping to store information corresponding to running programs to a main memory with a processing device in a user mode or an operating system mode, storing processor state information to a reserved portion of the main memory with the processing device in a hypervisor mode, protecting the main memory from memory access with the processing device in the hypervisor mode prior to disabling hardware components of the computing system, and disabling the hardware components of the computing system, wherein the processor state information identifies a configuration of the configurable memory mapping that associates physical memory addresses in the main memory and virtual memory addresses utilized by the processing device in the user mode or the operating system mode, and wherein the reserved portion of the main memory corresponds to a predefined memory mapping between the processing device in the hypervisor mode and the main memory; and
    exiting, by the computing system, the low power mode by enabling hardware components of the computing system, retrieving the processor state information from the reserved portion of the main memory with the processing device in the hypervisor mode, and loading the stored information corresponding to running programs from the main memory the processing device in the user mode or the operating system mode based, at least in part, on the configuration of the configurable memory mapping in the retrieved processor state information.

2. The method of claim 1, wherein exiting the low power mode further comprises setting an internal state of the processing device in the hypervisor mode with the retrieved processor state information, and switching from the hypervisor mode to the user mode or the operating system mode, while retaining the internal state of the processing device.

3. The method of claim 1, wherein the user mode and the operating system mode both have the configurable memory mapping between the processing device and the main memory.

4. The method of claim 1, further comprising determining, by a power management controller in the computing system, to power down the computing system, wherein entering the low power mode is performed in response to the determination to power down the computing system.

5. The method of claim 1, further comprising detecting, by the power management controller in the computing system, a wake-up event for the computing system, wherein exiting the low power mode is performed in response to the detected wake-up event.

6. The method of claim 1, wherein exiting the low power mode further comprises removing the protection of the main memory from memory access prior to retrieving the processor state information from the reserved portion of the main memory.

7. A system comprising:
    a memory system configured to store computer-executable instructions; and
    a computing system, in response to execution of the computer-executable instructions by a processing device, is configured to:
        enter a low power mode by utilizing a configurable memory mapping to store, with the processing device in a user mode or an operating system mode, information corresponding to running programs to the memory system, storing, with the processing device in a hypervisor mode, processor state information to a reserved portion of the memory system, protecting, with the processing device in the hypervisor mode, the memory system from memory access prior to disabling hardware components of the system, and disabling the hardware components of the system, wherein the processor state information identifies a configuration of the configurable memory mapping that associates physical memory addresses in the main memory and virtual memory addresses utilized by the processing device in the user mode or the operating system mode, and wherein the reserved portion of the main memory corresponds to a predefined memory mapping between the processing device in the hypervisor mode and the main memory; and
        exit the low power mode by enabling hardware components of the computing system, retrieving, with the processing device in the hypervisor mode, the processor state information from the reserved portion of the memory system, and loading, with the processing device in the user mode or the operating system mode, the stored information corresponding to running programs from the memory system based, at least in part, on the configuration of the configurable memory mapping in the retrieved processor state information.

8. The system of claim 7, wherein the computing system, during the exit from the low power mode, is further configured to set an internal state of the processing device in the hypervisor mode with the retrieved processor state information, and switch from the hypervisor mode to the user mode or the operating system mode, while retaining the internal state of the processing device.

9. The system of claim 7, wherein the user mode and the operating system mode have the configurable memory mapping between the processing device and the memory system.

10. The system of claim 7, further comprising a power management controller configured to determine when to power down the computing system, wherein the computing system is configured to enter the low power mode in response to the determination by the power management controller.

11. The system of claim 10, wherein the power management controller is configured to detect a wake-up event, and wherein the computing system is configured to exit the low power mode in response to the wake-up event detected by the power management controller.

12. The system of claim 7, wherein the processing device, during exit from the low power mode, is further configured to remove the protection of the memory system prior to retrieving the processor state information from the reserved portion of the memory system.

13. An apparatus comprising at least one non-transitory computer-readable memory device storing instructions configured to cause one or more processing devices to perform operations comprising:
 entering a low power mode by utilizing a configurable memory mapping to store information corresponding to running programs to a main memory while in a user mode or an operating system mode, storing processor state information to a reserved portion of the main memory while in a hypervisor mode, protecting, while in the hypervisor mode, the main memory from memory access with the processing devices prior to disabling hardware components of a computing system, and disabling the hardware components of the computing system, wherein the processor state information identifies a configuration of the configurable memory mapping that associates physical memory addresses in the main memory and virtual memory addresses utilized by the processing device in the user mode or the operating system mode, and wherein the reserved portion of the main memory corresponds to a predefined memory mapping between the processing device in the hypervisor mode and the main memory; and
 exiting the low power mode by enabling hardware components of the computing system, retrieving the processor state information from the reserved portion of the main memory while in the hypervisor mode, and loading the stored information corresponding to running programs from the main memory while in the user mode or the operating system mode based, at least in part, on the configuration of the configurable memory mapping in the retrieved processor state information.

14. The apparatus of claim 13, wherein exiting the low power mode further comprises setting, while in the hypervisor mode, an internal state of the processing devices with the retrieved processor state information, and switching from the hypervisor mode to the user mode or the operating system mode, while retaining the internal state of the processing devices.

15. The apparatus of claim 13, wherein the user mode and the operating system mode have the configurable memory mapping between the processing devices and the main memory.

16. The apparatus of claim 13, wherein entering the low power mode is performed in response to a determination by a power management controller in the computing system to power down the computing system.

17. The apparatus of claim 13, wherein exiting the low power mode is performed in response to a wake-up event detected by a power management controller in the computing system.

18. The apparatus of claim 13, wherein exiting the low power mode further comprises removing the protection of the main memory from memory access prior to retrieving the processor state information from the reserved portion of the main memory.

* * * * *